(12) United States Patent
Huang et al.

(10) Patent No.: US 7,039,797 B2
(45) Date of Patent: May 2, 2006

(54) METHOD OF ALLOCATING A BASIC INPUT/OUTPUT SYSTEM TO A SHADOW MEMORY

(75) Inventors: Yi-Chi Huang, Chung-Ho (TW); Yang-Ning Lien, Chung-Ho (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 532 days.

(21) Appl. No.: 10/462,756

(22) Filed: Jun. 17, 2003

(65) Prior Publication Data
US 2004/0186986 A1    Sep. 23, 2004

(30) Foreign Application Priority Data
Mar. 21, 2003    (TW) ............................... 92106386 A

(51) Int. Cl.
G06F 9/24 (2006.01)
G06F 9/445 (2006.01)
G06F 12/00 (2006.01)
G06F 12/02 (2006.01)

(52) U.S. Cl. .............................. 713/1; 713/2; 711/170; 711/171; 711/172

(58) Field of Classification Search ................... 713/1, 713/2; 711/172
See application file for complete search history.

(56) References Cited

U.S. PATENT DOCUMENTS

| 6,513,114 B1 * | 1/2003 | Wu et al. ....................... 713/2 |
| 6,567,911 B1 * | 5/2003 | Mahmoud ....................... 713/2 |
| 6,865,669 B1 * | 3/2005 | Mahmoud ....................... 713/1 |

* cited by examiner

Primary Examiner—Lynne H. Browne
Assistant Examiner—Stefan Stoynov
(74) Attorney, Agent, or Firm—Winston Hsu

(57) ABSTRACT

A method of allocating a basic input/output system to a shadow memory applied to a computer including a plurality of equipment having an operation read only memory and a shadow memory. The method includes executing the preliminary initialization of the equipment to acquire the capacity of the operation read only memory of each equipment after being initialized. Then the equipment is re-initialized according to the order of the capacity of each operation read only memory after being initialized from smallest capacity to largest capacity to allocate the shadow memory more effectively and increase the number of equipment to be enabled.

12 Claims, 6 Drawing Sheets

| Initialization Order (According to the order of installation) | Capacity of the operation read only memory before being initialized | Capacity of the operation read only memory after being initialized | Enabled successfully? | Usable capacity after correction (KB) |
|---|---|---|---|---|
| Display card | 32KB | 32KB | Yes (32KB<128KB) | 96KB (128−32=96) |
| RAID card | 32KB | 32KB | Yes (32KB<96KB) | 64KB (96−32=64) |
| The first SCSI equipment | 44KB | 21KB | Yes (44KB<64KB) | 20KB (64−44=20) |
| The second SCSI equipment | 64KB | 16KB | No (64KB>20KB) | 20KB (20−0=20) |
| LAN | 52KB | 6KB | No (52KB>20KB) | 20KB (20−0=20) |

Fig. 2 Prior art

| Initialization Order (According to the capccity after being initialized) | Capacity of the operation read only memory before being initialized | Capacity of the operation read only memory after being initialized | Enabled successfully? | Usable capacity after correction (KB) |
|---|---|---|---|---|
| Display card | 32KB | 32KB | Yes (32KB<128KB) | 96KB (128-32=96) |
| LAN | 52KB | 6KB | Yes (52KB<96KB) | 90KB (96-6=90) |
| The second SCSI equipment | 64KB | 16KB | Yes (64KB<90KB) | 74KB (90-16=74) |
| The first SCSI equipment | 44KB | 21KB | No (44KB<74KB) | 53KB (74-21=53) |
| RAID card | 32KB | 32KB | No (32KB<53KB) | 21KB (53-32=21) |

Fig. 6

METHOD OF ALLOCATING A BASIC INPUT/OUTPUT SYSTEM TO A SHADOW MEMORY

BACKGROUND OF INVENTION

1. Field of the Invention

The present invention relates to a method of allocating a basic input/output system to a shadow memory, and more particularly, to a method of allocating a basic input/output system to a shadow memory so that an optimum allocation is achieved to increase the number of equipment to be enabled.

2. Description of the Prior Art

In 1981, IBM started to write hardware program code for power on and subprogram codes for basic periphery input/output processing (such as displaying on a monitor or driving the floppy disk) into a read-only memory (ROM) when designing a personal computer. This code is called a basic input/output system (BIOS), and the memory for storing the program code is called an operation read only memory (operation ROM). When the computer is powered on, a microporcessor retrieves program codes from the read only memory, which store the basic input/output system, on a motherboard to acquire control power from the program codes representing the basic input/output system and starts to function. The jobs of power on self test (POST), reading pre setting data (for example: size for hard disk, system timing), and driving peripheries such as a hard disk and an optical disk are therefore performed. Additionally, the basic input/output system is not only established on the motherboard, but also many powerful equipment is embedded with the operation read only memory storing the basic input/output system. For example, a display card (VGA), a small computer system interface (SCSI) card, a three-dimensional (3D) accelerating card, a local area network (LAN) card, and a redundant array of independent device (RAID) card.

Since the operation speed of an operation read only memory storing the basic input/output system is much slower than that of a common dynamic random access memory (DRAM), manufacturers of personal computers usually scheme to copy the data in the operation read only memory into the dynamic random access memory when power on. When the operational system needs to utilize the functions or commands in the basic input/output system, the functions and commands can be executed in the dynamic random access memory, which has a quicker operation speed in comparison with the read only memory, to improve the total operation of system. The dynamic random access memory used for storing the basic input/output system is called a shadow memory. The shadow memory has already become a necessary device for executing particular functions on the motherboard. The shadow memory is between the address of C000:0000 to F000:FFFF in the memory of the computer. According to the segment of real mode addressing means, the shadow memory is divided into a C segment (C000:0000 to C000:FFFF), a D segment (D000:0000 to D000:FFFF), an E segment (E000:0000 to E000:FFFF), and an F segment (F000:0000 to F000:FFFF). The capacity of each segment is 64 KB. However, not only the basic input/output system of the computer stored in the operation read only memory is copied to the shadow memory, the basic input/output system of the equipment stored in the read only memory perhaps needs to be copied into the shadow memory to improve efficiency. In addition, the peripheral component interface (PCI), which has become a mainstream in recent years, clearly defines the initialization procedures for copying data to the shadow memory. The shadow memory thus becomes the necessary device for enabling equipment.

In the now existing computer configuration, the capacity of the shadow memory is normally 256 KB. The segment C is allocated to the display card having a capacity of 32 KB. The segment E and the segment F are allocated to the basic input/output system of the motherboard. As a result, the capacity of the space allocated to other equipment usually does not exceed 96 KB (256−32 −64−64=96).

At present, the basic input/output system is allocated to the shadow memory according to the order of installation. Please refer to FIG. 1. FIG. 1 is a flow chart of a prior art method for allocating the basic input/output system to the shadow memory. As shown in FIG. 1, the basic input/output system acquires the configuration of the first equipment after the computer is powered on, as shown in step 11.

The basic input/output system then determines in step 12 if there is an operation read only memory of the first equipment to be initialized. If there is, execute step 13; if there is not, go to step 16 to determine if the first equipment is the last equipment.

The basic input/output system can acquire the required capacity for initializing the operation read only memory of the equipment from the equipment configuration, and determines if the usable capacity of the shadow memory is sufficient to initialize the operation read only memory of the equipment in step 13. If it is, execute step 14. If is not, execute step 15 to record an error of not having enough shadow memory and come back to step 16.

In step 14, the basic input/output system will assign the operation read only memory of the equipment an address and a specific size in the shadow memory, according to the required capacity when initializing the operation read only memory. The specific size is equal to the size of the operation read only memory. The data in the operation read only memory is then copied to the assigned space in the shadow memory to execute initialization and to correct the usable capacity of the shadow memory. That means, the capacity of the space assigned to the initialized operation read only memory is subtracted from the remaining usable capacity of the shadow memory. In addition, only the data in some portion of the operation read only memory, depending on requirements, is necessary to be stored in the shadow memory to be used as a service routine during executing, after the operation read only memory is initialized to the shadow memory. Therefore, the capacity required by the operation read only memory in the shadow memory prior to initialization could be different from that after initialization.

After step 14 is completed, go to step 16. The basic input/output system will determine if the equipment mentioned in previous steps is the last equipment. If it is not, execute step 17 to acquire the configuration of the next equipment. Then come back to step 12 to execute step 12 to step 16, which have been previously mentioned, continuously. If the equipment is the last equipment, execute step 18. It is worth noticing that the basic input/output system usually acquires the configuration of all of the equipment, except the equipment to be assigned with higher priority, according to the order of installation. For example, since a display card is a very important equipment in a computer system, the configuration of the display card is normally acquired first. After that, each of the remaining equipment is allocated to the shadow memory according to the order of installation.

In step 18, the basic input/output system will determine if the error of not having enough shadow memory occurs. If so, execute step 19 and end the power-on procedure. If not, display an error message of not having enough shadow memory on the display to inform the user in step 19.

Owing to the limited usable space of the shadow memory, some of the equipment is not able to be enabled when there are several equipment having an operation read only memory, such as the interface card, are installed in the computer. As a result, some augment functions are not available. These situations frequently happened to this level of computer, such as a workstation and a server. Please refer to FIG. 2. FIG. 2 is an exemplary table for showing the prior art method of allocating the basic input/output system to the shadow memory. As shown in FIG. 2, if a VGA card (such as an ATI VGA card), a RAID card (such as an IBM ServeRAID-4L card), two SCSI equipment (for example, the first SCSI equipment is an Adaptec 29160 SCSI card, the second SCSI equipment is a LSI MPI SCSI card), and a LAN card (such as a Broadcom NetXtreme Gigabit Ethernet LAN card) are installed in the computer in sequence, the basic input/output system will first allocate the shadow memory to the display card. Since the usable capacity of the shadow memory is 128 KB, which is larger than the capacity of the operation read only memory of the display card 32 KB, the display card can be enabled successfully. Later, the RAID card and the first SCSI equipment can be sequentially enabled due to sufficient usable capacity in the shadow memory. However, the subsequent equipment, such as the second SCSI equipment and the LAN card, can not be enabled successfully because the usable capacity of the shadow memory is smaller than the capacity of the operation read only memory of both equipment, bringing a lot of perplexity to the user.

Nowadays, some of the basic input/output systems shut off the function of allocating the operation read only memories of specific equipment to the shadow memory to allow the other equipment having an operation read only memory to be enabled successfully. This method will no doubt reduce equipment efficiency. It is therefore very important to allocate the limited space in the shadow memory more efficiently to increase the number of equipment to be enabled. As previously mentioned, the capacity of the operation read only memory of each equipment prior to initialization could be different from that after initialization. For example, the capacity of the operation read only memory of the first SCSI equipment is 44 KB prior to initialization, and the capacity of the operation read only memory of the first SCSI equipment becomes 21 KB after initialization. The unutilized space, resulting from this difference, is ignored because the basic input/output system regards that this space has been allocated to a specific equipment. If the usable capacity of the shadow memory is corrected to the size of subtracting the capacity of the read only memory after initialization, the problem of inefficient utilizing the space in the shadow memory is avoided. For example, the usable capacity of the shadow memory after the first SCSI equipment is initialized to 43 KB, rather than 20 KB. Furthermore, the difference of capacity between the non-initialized operation read only memory and the initialized operation read only memory may allow the shadow memory to be able to accommodate the capacity of the operation read only memory after initialization, but to not be able to accommodate the capacity of the operation read only memory prior to initialization. Thus, if the order of allocating the shadow memory is changed, this operation read only memory is able to be allocated to the shadow memory. That means, to change the order of allocating the shadow memory will increase the number of equipment to be enabled.

It is therefore very important to automatically analyze the capacity of the operation read only memories of the equipment after being initialized, by utilizing preliminary initialization, to allow each of the equipment to be initialized according to the order of the capacity of the operation read only memories, from smallest capacity to largest capacity. The shadow memory is allocated more effectively to increase the number of equipment to be enabled.

SUMMARY OF INVENTION

It is a primary objective of the claimed invention to provide a method for allocating the basic input/output system to the shadow memory more effectively.

The claimed invention method for allocating a basic input/output system to a shadow memory is applied to a computer comprising a plurality of equipment, each of the plurality of equipment having an operation read only memory and being equipped with a shadow memory. The method comprises the following steps: (A) to initialize the operation read only memory of each of the equipment to the shadow memory to record the capacity of each operation read only memory after being initialized to the shadow memory; (B) to determine the initialization order of the equipment according to the capacity of the operation read only memories after being initialized, from smallest capacity to largest capacity; and (C) to re-initialize the operation read only memories of the equipment to the shadow memory according to the previously determined order.

It is an advantage of the claimed invention that the present invention method executes the preliminary initialization (step 21) first to acquire the capacity of the operation read only memories of all equipment after being initialized. Then all of the equipment having an operation read only memory is sorted to acquire the allocating order according to assignment priority and the capacity of each operation read only memory after being initialized, from smallest capacity to largest capacity. Finally, the re-initialization is executed according to the determined allocation order to enable the corresponding equipment in sequence. The present invention method not only allows the shadow memory to be allocated more effectively, but also increases the number of equipment to be enabled.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 2 is an exemplary table for showing the prior art method of allocating the basic input/output system to the shadow memory.

FIG. 6 is an exemplary table for showing the method of allocating the basic input/output system to the shadow memory according to the preferred embodiment of the present invention.

DETAILED DESCRIPTION

The previously mentioned and other technical content, features, and functions of the present invention are clearly illustrated in a preferred embodiment of the present invention and reference drawings.

The present invention method of allocating a basic input/output system to a shadow memory is applied to a computer, such as a personal computer, a workstation, or a server. The computer is a common computer. The shadow memory is installed on a motherboard of the computer for temporary storing the data in the basic input/output system and in the operation read only memory of each equipment. The preferred embodiment of the present invention is to combine a software or a firmware with the basic input/output system in the motherboard to allow the shadow memory to be allocated when the computer is powered on. Those of ordinary skill in the art are ready to know that the present invention method combines the software with the operation system (OS) of the computer to allow the shadow memory to be allocated after the operation system is enabled. Actually, the present invention is not limited in this preferred embodiment. In order to illustrate more conveniently, assume the capacity of the shadow memory in the preferred embodiment is 256 KB, and a C segment (C000:0000 to C000:FFFF), a D segment (D000:0000 to D000:FFFF), an E segment (E000:0000 to E000:FFFF), and an F segment (F000:0000 to F000:FFFF) are contained in the shadow memory. The E segment and the F segment are occupied by the basic input/output system of the computer, and the C segment is allocated to the display card beforehand. Therefore, the preferred embodiment is for allocating the remaining usable capacity of the shadow memory after the shadow memory is occupied by the basic input/output system. That means, to allocate the C segment and the D segment and the total capacity of the C segment and the D segment is 128 KB. In order to compare more conveniently, assume the computer in the preferred embodiment comprises a plurality of equipment, being the same as the equipment comprised in the prior art computer, and each of the equipment has an operation read only memory. The equipment comprise a VGA card such as an ATI VGA card, a RAID card such as an IBM ServeRaid-4L card, a first SCSI equipment such as an Adaptec 29160 SCSI card, a second SCSI equipment such as a LSI MPI SCSI, and a LAN card such as a Broadcom NetXtreme Gigabit Ethernet LAN.

Figure 1:
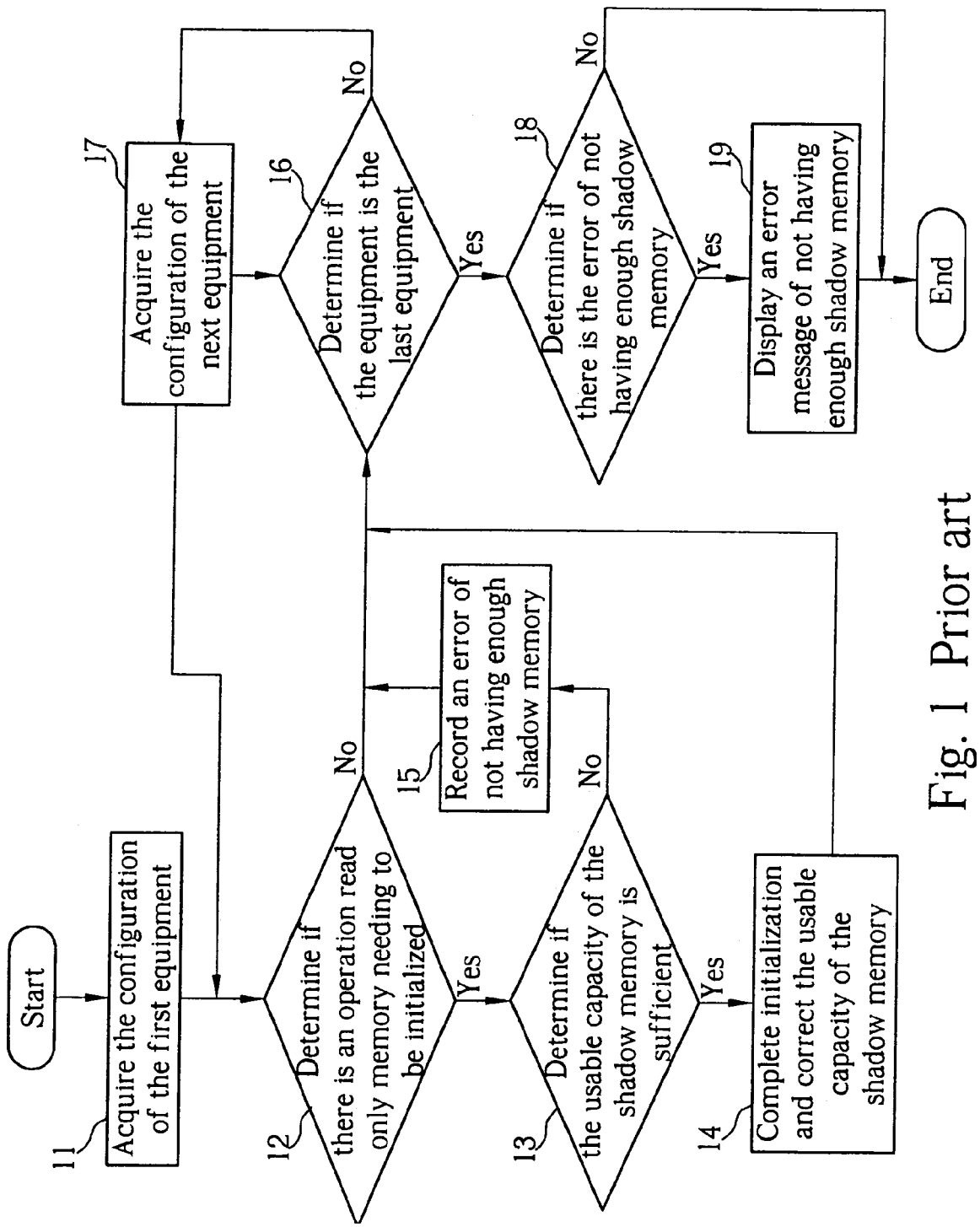
FIG. 1 is a flow chart of a prior art method for allocating the basic input/output system to the shadow memory.
Figure 3:
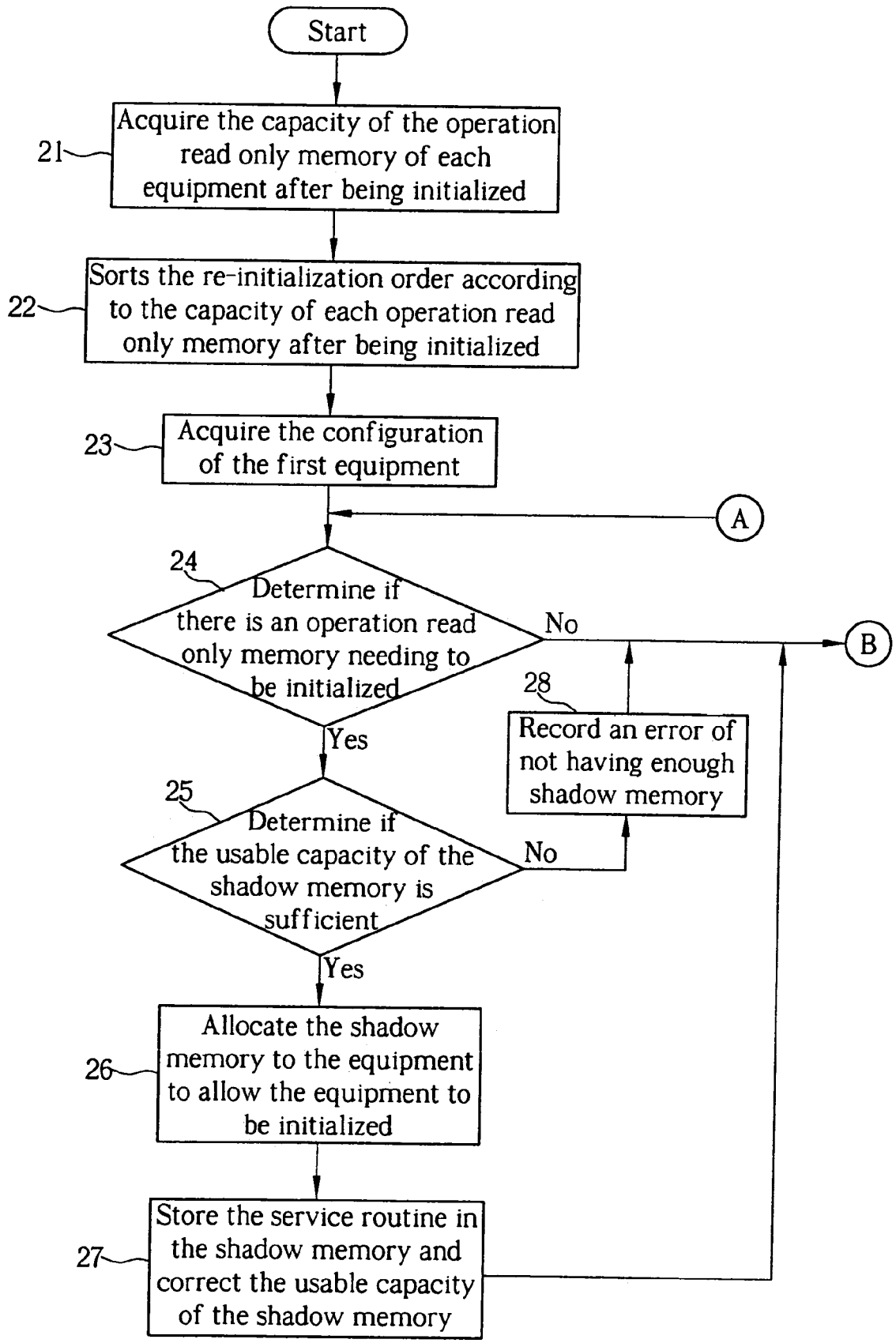
FIG. 3 and FIG. 4 are flow charts of a preferred embodiment of the present invention for allocating the basic input/output system to the shadow memory.
Figure 4:
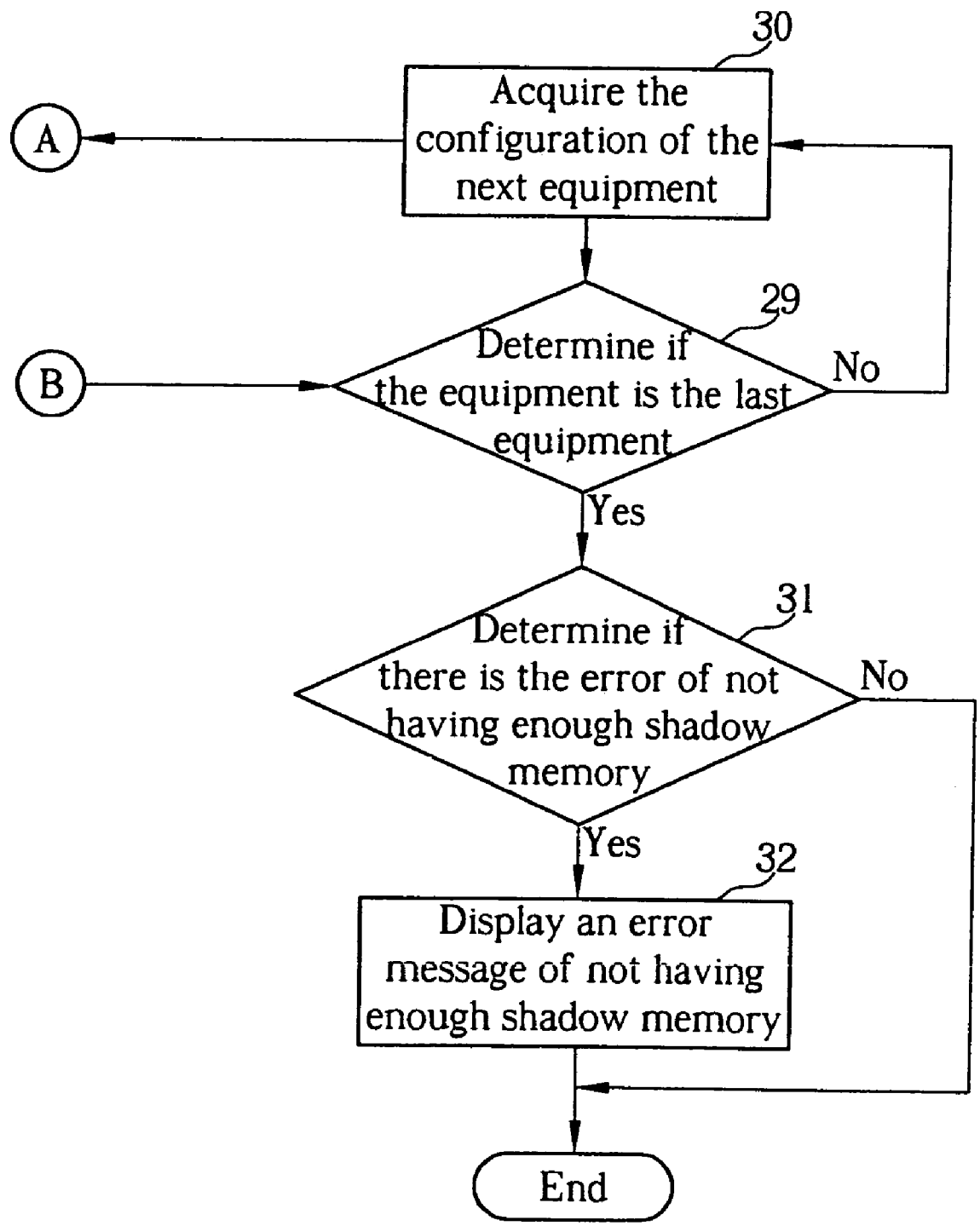

Please refer to FIG. 3 and FIG. 4. FIG. 3 and FIG. 4 are flow charts of the preferred embodiment of the present invention for allocating the basic input/output system to the shadow memory. In the following, the previously mentioned settings, FIG. 3 and FIG. 4 are utilized for illustrating the method of allocating the shadow memory according to the preferred embodiment. The method according to the preferred embodiment is executed by the basic input/output system after the computer is powered on.

First, each of the equipment in the computer is preliminarily initialized to acquire the required capacity of the shadow memory occupied by the operation read only memory of each of the equipment after initialization, by an automatically analytical means, in step 21.

Figure 5:
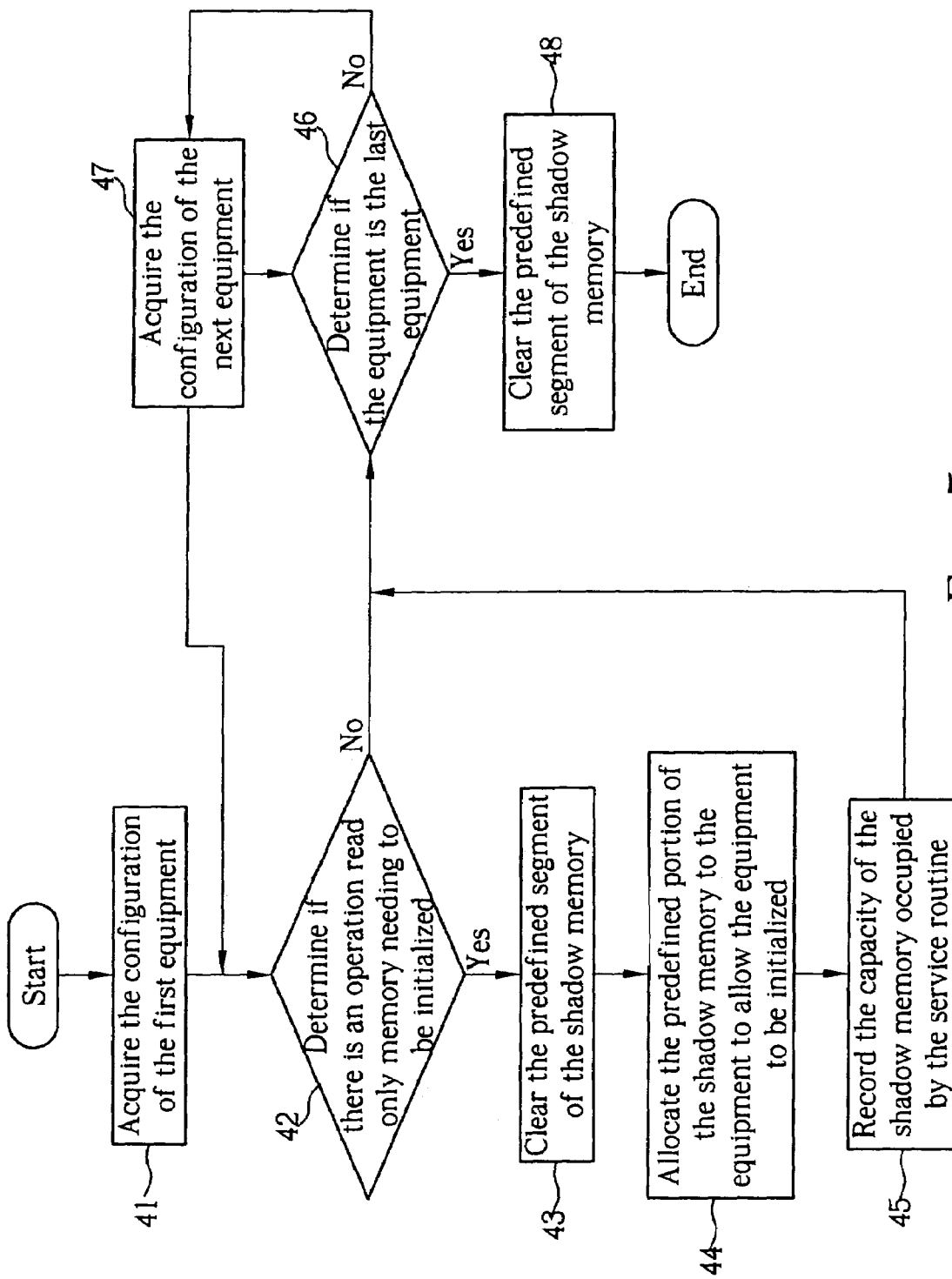
FIG. 5 is an exemplary flow chart for acquiring the capacity after the operation read only memory of each equipment is initialized in FIG. 3 and FIG. 4.

Please refer to FIG. 5. FIG. 5 is an exemplary flow chart for acquiring the capacity after the operation read only memory of each equipment is initialized in FIG. 3 and FIG. 4. According to the preferred embodiment of the present invention, the preliminary initialization is executed after the computer is powered on. In step 41, the configuration of the first equipment is acquired. Then determine if there is the operation read only memory of the equipment need to be initialized in step 42. If there is, execute step 43. If there is not, go to step 46 to determine if the equipment is the last equipment. In step 43, the basic input/output system will clear a predefined segment of the shadow memory to allow the operation read only memory of the equipment to be initialized. Since the capacity of the operation read only memory of common equipment does not exceed 64 KB before being initialized, the predefined segment in this preferred embodiment is set as the D segment. Those of ordinary skill in the art should know that the address and size of the predefined segment may be adjusted according to practical requirements and are not limited in what is disclosed in the specification. After the predefined segment is cleared in step 43, step 44 is executed. The basic input/output system will allocate the predefined segment to the operation read only memory of the equipment to allow the operation read only memory to be initialized. After finishing initialization, execute step 45. Because the shadow memory only stores some portion of operation read only memory (the service routine of the operation read only memory) after the initialization is finished, the basic input/output system can acquire and record the capacity of the shadow memory occupied by the operation read only memory of the equipment after being initialized in step 45. The flow then goes to step 46. In step 46, the basic input/output system will determine if the previous mentioned equipment is the last equipment. If it is, execute step 48 to clear the data in the predefined segment of the shadow memory and end the flow. If it is not, execute step 47 to acquire the configuration of the next equipment and execute steps 42 to 46 continuously. Steps 42 to 47 are executed repeatedly until the capacity of the operation read only memories of all equipment after being initialized is acquired. By executing step 21, the capacity of the operation read only memories after being initialized is acquired. Please refer to FIG. 6. FIG. 6 is an exemplary table for showing the method of allocating the basic input/output system to the shadow memory according to the preferred embodiment of the present invention. As shown in FIG. 6, the capacity of the display card after being initialized is 32 KB, the capacity of the RAID card after being initialized is 32 KB, the capacity of the first SCSI equipment after being initialized is 21 KB, the capacity of the second SCSI equipment after being initialized is 16 KB, and capacity of the LAN card after being initialized is 6 KB. It is worth noticing that although step 21 is illustrated with the example shown in FIG. 5, those of ordinary skill in the art should know that step 21 can be executed by other methods, which are able to acquire the capacity of the operation read only memories of all equipment after being initialized, and is not limited in description of the specification.

Please refer back to FIG. 3 and FIG. 4, step 22 is executed after step 21 is executed. In step 22, the basic input/output system sorts the equipment according to the capacity of the shadow memory occupied by the operation read only memory of each equipment after being initialized, and the order is arranged from smallest capacity to largest capacity. The re-initialization order of the equipment in a subsequent step is thus determined. Since the equipment initialized first occupies a smaller space after being initialized, a larger space is reserved for the equipment to be initialized subsequently. Because some equipment, such as the display card, in the computer is necessary to be enabled, this kind of equipment is regarded as assigned equipment according to the preferred embodiment of the present invention. As a result, the basic input/output system is asked to sort the assigned equipment first, followed by the other equipment according to the capacity, from smallest to largest, to allow the assigned equipment to be always enabled. As shown in FIG. 6, the order of the equipment after initialization is the display card, the LAN card, the second SCSI equipment, the first SCSI equipment, and the RAIDcard, according to the capacity after being initialized and the principle of assigned equipment first. In addition, the preferred embodiment of the present invention is only used for determining the initialization order of the equipment having an operation read only memory. The initialization order of equipment that does not have an operation read only memory, such as the hard disk, the floppy disk, etc, is determined according to the prior art method. Since the method of determining the initialization order of other equipment is not a stressed point in the present invention and should be obvious to those of ordinary skill in the art, it is not mentioned redundantly.

Next, the re-initialization is executed in step 23.

According to the order determined in step 22, the configuration of the first equipment is acquired. Then determine if there is an operation read only memory of the first equipment to be initialized in step 24. If there is, execute step 25; if there is not, execute step 29.

In step 25, if the usable capacity of the shadow memory is sufficient to initialize the operation read only memory of the equipment is determined. In other words, it is determined if the usable capacity of the shadow memory is not smaller than the original capacity of the operation read only memory (the capacity of the operation read only memory before being initialized). If it is not sufficient, execute step 28 to record an error of not having enough shadow memory and go to step 29 after recording. If the capacity of the shadow memory is sufficient for initializing the operation read only memory of the equipment, execute step 26.

In step 26, the basic input/output system will assign the operation read only memory of the equipment an address and a specific size in the shadow memory, according to the capacity of the operation read only memory of the equipment before being initialized, to allow the operation read only memory to be initialized. The capacity of the shadow memory assigned by the basic input/output system is not smaller than the capacity of the operation read only memory before being initialized so that the operation read only memory is copied to the shadow memory to execute initialization.

In step 27, the basic input/output system will store the initialized portion of the operation read only memory (the service routine of the read only memory) in the shadow memory and calculate the remaining usable capacity of the shadow memory. That means, the usable capacity of the shadow memory is corrected by subtracting the capacity of the operation read only memory after being initialized from the usable capacity of the shadow memory in step 25. After step 27 is executed, go to step 29.

In step 29, the basic input/output system will determine if the equipment mentioned in previous steps is the last equipment. If it is, execute step 31. If it is not, go to step 30 to acquire the configuration of the next equipment. Then come back to step 24 to execute step 24 to step 30 repeatedly until all of the equipment is initialized.

In step 31, the basic input/output system will determine if the error of not having enough shadow memory occurs. If so, step 28 mentioned previously has been executed. Step 32 is therefore executed to display the error message of not having enough shadow memory on the display of the computer. The power on procedure is thus ended. If not, skip step 32 to end the power up procedure right away.

After re-executing the initialization of the equipment according to the previously mentioned procedure, as shown in FIG. 6, the display card in the equipment having an operation read only memory is initialized first. Because the usable capacity of the shadow memory (128 KB) is larger than the capacity of the operation read only memory of the display card before being initialized (32 KB), the display card can be initialized successfully and the usable capacity of the shadow memory is corrected to 96 KB (128 KB−32 KB=96 KB). Since the capacity of the operation read only memory of the LAN card after being initialized (6 KB) is the smallest among all of the remaining equipment, the LAN card is initialized right after the display card. Because the usable capacity of the shadow memory (96 KB) is larger than the capacity of the operation read only memory of the LAN card before being initialized (52 KB), the LAN card can be initialized successfully and the usable capacity of the shadow memory is corrected to 90 KB (96 KB−6 KB=90 KB). Later, since the capacity of the operation read only memory of the second SCSI equipment before being initialized (64 KB) is smaller than the usable capacity of the shadow memory (90 KB), the second SCSI equipment can be enabled successfully and the usable capacity of the shadow memory is corrected to 74 KB (90 KB−16 KB=74 KB). After that, because the capacity of the operation read only memory of the first SCSI equipment before being initialized (44 KB) is still smaller than the usable capacity of the shadow memory (74 KB), the first SCSI equipment can be enabled successfully and the usable capacity of the shadow memory is corrected to 53 KB (74 KB−21 KB=53 KB). Finally, since the capacity of the operation read only memory of the RAID card before being initialized (32 KB) is still smaller than the usable capacity of the shadow memory (53 KB), the RAID card can be enabled successfully and the usable capacity of the shadow memory is corrected to 21 KB (53 KB−32 KB=21 KB).

Different from the prior art method of allocating the shadow memory according to the order of installation, the present invention method changes the allocation order of the shadow memory so that the allocation order of the shadow memory is according to the capacity of the operation read only memory of each equipment, from smallest capacity to largest capacity, after being initialized. With a computer having the same configuration, the prior art method can only enable the display card, the RAID card, and the first SCSI equipment, and can not enable the second SCSI equipment and the LAN card, as shown in FIG. 2. On the other hand, the method according to the preferred embodiment of the present invention enables all of the equipment successfully, as shown in FIG. 6, by enabling the equipment having the smallest capacity of the operation read only memory first. Compared with the prior art method, the present invention method will definitely allocate the shadow memory more effectively and increase the number of equipment having an operation read only memory to be enabled.

In summary, the present invention method of allocating the basic input/output system to the shadow memory is obviously different from the prior art method, which only executes initialization one time and according to the order of installation. The present invention method executes the preliminary initialization (step 21) first to acquire the capacity of the operation read only memories of all equipment after being initialized by utilizing the predefined segment in the shadow memory. Then all of the equipment having an operation read only memory is sorted to acquire the allocating order according to assignment priority and the capacity of each operation read only memory after being initialized, from smallest capacity to largest capacity. Finally, the re-initialization is executed according to the determined allocation order to enable the corresponding equipment in sequence. The present invention method allows the shadow memory to be allocated more effectively and increase the number of equipment to be enabled with the limited capacity of the shadow memory.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method of allocating a basic input/output system (BIOS) to a shadow memory applied to a computer comprising a plurality of equipment, each of the plurality of equipment having an operation read only memory (operation ROM), the computer being equipped with a shadow memory, the method comprising the following steps:
    (A) initializing the operation read only memory of each of the equipment to the shadow memory to record the capacity of each operation read only memory after being initialized to the shadow memory;
    (B) determining the initialization order of the equipment according to the capacity of each operation read only memory, wherein the order is arranged from smallest capacity to largest capacity; and
    (C) re-initializing the operation read only memory of each of the equipment to the shadow memory according to the previously determined order.

2. The method of claim 1 wherein step (A) further comprises the following steps:
    (A-1) initializing one of the operation read only memories of the equipment to a predefined segment of the shadow memory to record the capacity of the operation read only memory after being initialized;
    (A-2) clearing the predefined segment of the shadow memory;
    (A-3) executing step (A-1) if at least one of the equipment is not initialized to initialize the non-initialized equipment; and
    (A-4) clearing the predefined segment if all of the equipment is initialized.

3. The method of claim 1 wherein if one of the equipment is an assigned equipment, the assigned equipment is allocated prior to the allocation of the other equipment, and the other equipment is sorted according to the capacity of the operation read only memories of the other equipment from smallest to largest after being initialized when executing step (B).

4. The method of claim 3 wherein the assigned equipment is a display card.

5. The method of claim 1 wherein step (C) further comprises the following steps:
    (C-1) initializing the operation read only memory of a first priority equipment to the shadow memory according to the order determined in the previous step;
    (C-2) correcting a usable capacity of the shadow memory by subtracting the capacity of the operation read only memory after being initialized from the usable capacity of the shadow memory before initialization; and
    (C-3) initializing the operation read only memory of a non-initialized equipment to the shadow memory and executing step (C-2) if at least one of the equipment is not initialized.

6. The method of claim 5 wherein the first priority equipment is initialized when the usable capacity of the shadow memory is not smaller than the capacity of the operation read only memory of the first priority equipment in step (C-1).

7. The method of claim 6 wherein step (C) further comprises a step (C-4) for recording an error of not having enough shadow memory when the capacity of the operation read only memory of the equipment to be initialized is larger than the usable capacity of the shadow memory.

8. The method of claim 5 wherein the non-initialized equipment is initialized when the capacity of the operation read only memory of the non-initialized equipment is not larger than the usable capacity of the shadow memory in step (C-3).

9. The method of claim 8 wherein step (C) further comprises a step (C-4) for recording an error of not having enough shadow memory when the capacity of the operation read only memory of the equipment to be initialized is larger than the usable capacity of the shadow memory.

10. The method of claim 9 wherein step (C) further comprises a step (C-5) for judging if the error of not having enough shadow memory occurred in step (C-4) after all of the equipment is initialized, and if the error occurred, displaying an error message on the computer.

11. The method of claim 2 wherein the capacity of the predefined segment is not smaller than the capacity of the operation read only memory of each equipment.

12. The method of claim 11 wherein the capacity of the predefined segment of the shadow memory is 64 KB.

* * * * *